United States Patent
Bates

(10) Patent No.: US 9,396,444 B2
(45) Date of Patent: Jul. 19, 2016

(54) PREDICTIVE ANALYTICS WITH FORECASTING MODEL SELECTION

(75) Inventor: John Bates, Springville, UT (US)

(73) Assignee: Adobe Systems Incorporated, San Jose, CA (US)

( * ) Notice: Subject to any disclaimer, the term of this patent is extended or adjusted under 35 U.S.C. 154(b) by 954 days.

(21) Appl. No.: 13/335,641

(22) Filed: Dec. 22, 2011

(65) Prior Publication Data

US 2014/0303953 A1    Oct. 9, 2014

(51) Int. Cl.
*G06F 9/45*   (2006.01)
*G06Q 10/04*  (2012.01)
*G06Q 30/02*  (2012.01)

(52) U.S. Cl.
CPC ............... *G06Q 10/04* (2013.01); *G06Q 30/02* (2013.01); *G06Q 30/0202* (2013.01)

(58) Field of Classification Search
CPC .... G06Q 10/04; G06Q 30/02; G06Q 30/0202
USPC ...................................... 703/21, 22
See application file for complete search history.

(56) References Cited

U.S. PATENT DOCUMENTS

| | | | | |
|---|---|---|---|---|
| 7,499,897 B2* | 3/2009 | Pinto et al. | | 706/46 |
| 7,562,058 B2* | 7/2009 | Pinto et al. | | 706/21 |
| 7,725,300 B2* | 5/2010 | Pinto et al. | | 703/2 |
| 7,730,003 B2* | 6/2010 | Pinto et al. | | 706/21 |
| 7,734,775 B2* | 6/2010 | Barnett et al. | | 709/224 |
| 7,933,762 B2* | 4/2011 | Pinto et al. | | 703/22 |
| 8,326,970 B2* | 12/2012 | Cherkasova et al. | | 709/224 |
| 8,554,699 B2* | 10/2013 | Ruhl et al. | | 706/12 |
| 8,583,584 B2* | 11/2013 | Ruhl et al. | | 706/52 |
| 8,682,718 B2* | 3/2014 | Zwicky | | 705/14.26 |
| 8,751,273 B2* | 6/2014 | Pinto et al. | | 705/7.11 |
| 2004/0215495 A1* | 10/2004 | Eder | | 705/7 |
| 2011/0119100 A1* | 5/2011 | Ruhl et al. | | 705/7.11 |

OTHER PUBLICATIONS

Das, Krantik; Vidyashankar, G.S. (Jul. 1, 2006), "Competitive Advantage in Retail Through Analytics: Developing Insights, Creating Value", Information Management, pp. 1-8.

* cited by examiner

*Primary Examiner* — Kamini S Shah
*Assistant Examiner* — Juan Ochoa
(74) *Attorney, Agent, or Firm* — Kilpatrick Townsend & Stockton LLP

(57) ABSTRACT

Methods and apparatus for predicting network activity with forecasting model selection are disclosed. In one embodiment a network analytics forecasting model with a preferred model error measurement is selected from among a set of model error measurements for a set of network analytics forecasting models. The selecting includes, for each of a set of network analytics forecasting models, calculating a set of predicted network analytics metric values corresponding to individual ones of a set of actual network analytics metric values in a network analytics metrics data set, comparing individual ones of the set of predicted network analytics metric values to corresponding ones of the set of actual network analytics metric values, and generating a model error measurement reflecting the comparing. Future network analytics metric values are predicted using the network analytics forecasting model with the preferred model error measurement.

15 Claims, 10 Drawing Sheets

PREDICTIVE ANALYTICS WITH FORECASTING MODEL SELECTION

BACKGROUND

1. Description of the Related Art

Goods and services providers often employ various forms of marketing to drive consumer demand for products and services. Marketing includes various techniques to expose to target audiences to brands, products, services, and so forth. For example, marketing often includes providing promotions (e.g., advertisements) to an audience to encourage them to purchase a product or service. In some instances, promotions are provided through media outlets, such as television, radio, and the internet via television commercials, radio commercials and webpage advertisements. In the context of websites, marketing may provide advertisements for a website and products associated therewith to encourage persons to visit the website, use the website, purchase products and services offered via the website, or otherwise interact with the website.

Marketing promotions often require a large financial investment. A business may fund an advertisement campaign with the expectation that increases in revenue attributable to marketing promotions exceed the associated cost. A marketing campaign may be considered effective if it creates enough interest and/or revenue to offset the associated cost. Accordingly, marketers often desire to track the effectiveness of their marketing techniques generally, as well as the effectiveness of specific promotions. For example, a marketer may desire to know how many customers purchased a product as a result of a particular placement of an ad in a website.

In the context of internet advertising, tracking user interaction with a website is known as "web analytics." Web analytics is the measurement, collection, analysis and reporting of internet data for purposes of understanding and optimizing web usage. Web analytics provides information about the number of visitors to a website and the number of page views, as well as providing information about the behavior of users while they are viewing the site. Businesses desire to predict the future values of metrics that are compiled as a part of web analytics.

2. Technical Field

The present disclosure generally relates to a system, method, and apparatus for predicting network activity with forecasting model selection.

SUMMARY

Methods and apparatus for predicting network activity with forecasting model selection are disclosed. In one embodiment a network analytics forecasting model with a preferred model error measurement is selected from among a set of model error measurements for a set of network analytics forecasting models. The selecting includes, for each of a set of network analytics forecasting models, calculating a set of predicted network analytics metric values corresponding to individual ones of a set of actual network analytics metric values in a network analytics metrics data set, comparing individual ones of the set of predicted network analytics metric values to corresponding ones of the set of actual network analytics metric values, and generating a model error measurement reflecting the comparing. Future network analytics metric values are predicted using the network analytics forecasting model with the preferred model error measurement.

Figure 1:
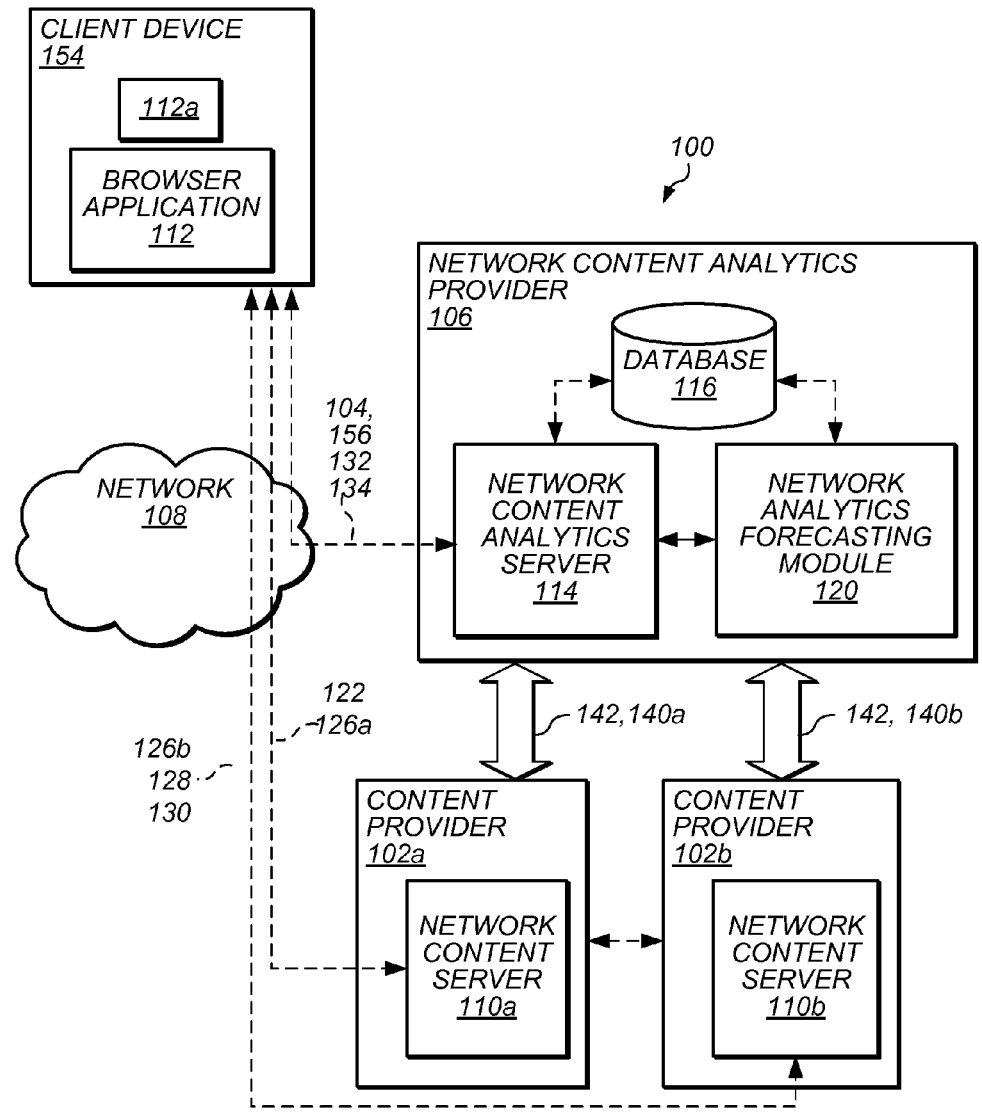
FIG. 1 illustrates an example network content analytics system configured to support predictive analysis of network analytics with model selection in accordance with one or more embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result.

In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Predictive Analytics for Network Activity

Various embodiments of methods and apparatus for predictive analysis of network activity with model selection include support for predicting future network activity based on a forecast model selected on the basis of a measure of error between the predictions of the selected model and corresponding historical values of data. Some embodiments predict future network analytics metric values using a network analytics forecasting model. In some embodiments, the model is selected based on having a preferred model error measurement from a group of network analytics forecasting models. Some embodiments support selecting a network analytics forecasting model with a preferred model error measurement from among a set of model error measurements for a set of network analytics forecasting models. In some embodiments, the selecting includes, for each of a set of network analytics forecasting models, calculating a set of predicted network analytics metric values corresponding to individual ones of a set of actual network analytics metric values in a network analytics metrics data set, comparing individual ones of the set of predicted network analytics metric values to corresponding ones of the set of actual network analytics metric values, and generating a model error measurement reflecting the comparing. Some embodiments select a set of parameter values with a preferred model error measurement for the selected model from among a set of model error measurements for a set of parameter value sets.

Some embodiments may include a means for accessing or loading data indicative of network activity for analysis. For example, a network analytics forecasting module may receive input describing the network activity for the network content provider, and may calculate metrics and trend identifiers, provide graphical displays describing various aspects of the network activity for the network content provider, and predict future network activity based on models and parameters selected as described herein. The network analytics forecasting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input describing the network activity for the network content provider, calculating metrics and trend identifiers, providing graphical displays describing various aspects of the network activity for the network content provider, and predicting future network activity based on models and parameters selected as described herein. Other embodiments of the network analytics forecasting module may be at least partially implemented by hardware circuitry and/or firmware stored, for example, in a non-volatile memory.

Systems for Predictive Analytics of Network Activity

FIG. 1 illustrates an example network content analytics system configured to support predictive analysis of network analytics with model selection in accordance with one or more embodiments. A network content analytics system 100 in accordance with one or more embodiments may be employed to accumulate and/or process analytics data 104 representing various aspects of network activity used to assess and predict effectiveness of one or more items of network content. In the illustrated embodiment, system 100 includes content providers 102a and 102b hosting network content servers 110a and 110b, respectively, a client device 154 and a network content analytics provider 106.

Each of content providers 102a and 102b, client device 154 and network content analytics provider 106 may be communicatively coupled to one another via a network 108. Network 108 may include any channel for providing effective communication between each of the entities of system 100. In some embodiments, network 108 includes an electronic communication network, such as the internet, a local area network (LAN), a cellular communications network, or the like. Network 108 may include a single network or combination of networks that facilitate communication between each of the entities (e.g., content providers 102a and 102b, client device 154 and network content analytics provider 106) of system 100.

Client device 154 may retrieve content from content providers 102a and/or 102b via network 108. Client device 154 may transmit corresponding analytics data 104 to network content analytics provider 106 via network 108. Network content analytics provider 106 may employ a network activity analytics forecasting module 120 to assess analytics data 104 and to perform selecting a network analytics forecasting model with a preferred model error measurement from among a set of model error measurements for a set of network analytics forecasting models, selecting a set of parameter values with a preferred model error measurement, and predicting future network analytics metric values using the network analytics forecasting model with the preferred model error measurement, as described herein.

For example, network analytics forecasting module 120 may be used to perform a method in which the selecting includes, for each of a set of network analytics forecasting models, calculating a set of predicted network analytics metric values corresponding to individual ones of a set of actual network analytics metric values in a network analytics metrics data set, comparing individual ones of the set of predicted network analytics metric values to corresponding ones of the set of actual network analytics metric values, and generating a model error measurement reflecting the comparing. As a further example, network analytics forecasting module 120 may be used to perform, for each of a plurality of sets of parameter values of parameters of the network analytics forecasting model with the preferred error measurement, calculating a corresponding set of predicted network analytics metric values corresponding to individual ones of the set of actual network analytics metric values in the network analytics metrics data set, comparing individual ones of the corresponding set of predicted network analytics metric values to corresponding ones of the set of actual network analytics metric values to generate a parameter set error measurement, and generating an error measurement reflecting the comparing. In some embodiments, network analytics forecasting module 120 may be used to perform selecting a set of parameter values with a preferred model error measurement. While network analytics forecasting module 120 is shown in FIG. 1 as a component of network content analytics provider 106, one of skill in the art will readily realize in light of having read the present disclosure that network analytics forecasting module 120 may be embodied in a separate system with access to a database 116 through network content analytics server 114 via network 108.

Content providers 102a and/or 102b may include source of information/content (e.g., an HTML file defining display information for a webpage) that is provided to client device 154. For example content providers 102a and/or 102b may include vendor websites used to present retail merchandise to a consumer. In some embodiments, content providers 102a and 102b may include respective network content servers 110a and 110b. Network content servers 110a and 110b may include web content 126a and 126b stored thereon, such as HTML files that are accessed and loaded by client device 154 for viewing webpages of content providers 102a and 102b. In some embodiments, content providers 102a and 102b may serve client device 154 directly. For example, content 126 may be provided from each of servers 110a or 110b directly to client device 154. In some embodiments, one of content providers 102a and 102b may act as a proxy for the other of content providers 102a and 102b. For example, server 110a may relay content from server 110b to client device 154.

Client device 154 may include a computer or similar device used to interact with content providers 102a and 102b. In some embodiments, client device 154 includes a wireless device used to access content 126a (e.g., web pages of a websites) from content providers 102a and 102b via network 108. For example, client device 154 may include a personal computer, a cellular phone, a personal digital assistant (PDA), or the like.

In some embodiments, client device 154 may include an application (e.g., internet web-browser application) 112 that can be used to generate a request for content, to render content, and/or to communicate request to various devices on the network. For example, upon selection of a website link on a webpage displayed to the user by browser application 112, browser application 112 may submit a request for the corresponding webpage/content to web content server 110a, and web content server 110a may provide corresponding content 126a, including an HTML file, that is executed by browser application 112 to render the requested website for display to the user. In some instances, execution of the HTML file may cause browser application 112 to generate additional request for additional content (e.g., an image referenced in the HTML file as discussed below) from a remote location, such as content providers 102a and 102b and/or network content analytics provider 106. The resulting webpage 112a may be viewed by a user via a video monitor or similar graphical presentation device of client device 154. While webpage 112a is discussed as an example of the network content available for use with the embodiments described herein, one of skill in the art will readily realize that other forms of content, such as audio or moving image video files, may be used without departing from the scope and content herein disclosed. Likewise, while references herein to HTML and the HTTP protocol are discussed as an example of the languages and protocols available for use with the embodiments described herein, one of skill in the art will readily realize that other forms of languages and protocols, such as XML or FTP may be used without departing from the scope and content herein disclosed.

Network analytics provider 106 may include a system for the collection and processing of analytics data 104, and the generation and prediction of corresponding metrics (e.g., hits, page views, visits, sessions, downloads, first visits, first sessions, visitors, unique visitors, unique users, repeat visitors, new visitors, impressions, singletons, bounce rates, exit percentages, visibility time, session duration, page view duration, time on page, active time, engagement time, page depth, page views per session, frequency, session per unique, click path, click, site overlay) web analytics reports including various metrics of the web analytics data (e.g., a promotion effectiveness index and/or a promotion effectiveness ranking) based on forecast models and parameters selected with respect to performance in predicting existing metrics data. Analytics data 104 may include data that describes usage and visitation patterns for websites and/or individual webpages within the website. Analytics data 104 may include information relating to the activity and interactions of one or more users with a given website or webpage. For example, analytics data 104 may include historic and/or current website browsing information for one or more website visitors, including, but not limited to identification of links selected, identification of web pages viewed, identification of conversions (e.g., desired actions taken—such as the purchase of an item), number of purchases, value of purchases, and other data that may help gauge user interactions with webpages/websites.

In some embodiments, analytics data 104 includes information indicative of a location. For example analytics data may include location data 108 indicative of a geographic location of client device 154. In some embodiments, location data 108 may be correlated with corresponding user activity. For example, a set of received analytics data 104 may include information regarding a user's interaction with a web page (e.g., activity data) and corresponding location data indicative of a location of client device 154 at the time of the activity. Thus, in some embodiments, analytics data 104 can be used to forecast a user's activity and based on location of the user during the activities. In some embodiments, location data includes geographic location information. For example, location data may include an indication of the geographic coordinates (e.g., latitude and longitude coordinates), IP address or the like or a user or a device.

In some embodiments, analytics data 104 is accumulated over time to generate and forecast a set of analytics data (e.g., an analytics dataset) that is representative of activity and interactions of one or more users with a given website or webpage. For example, an analytics dataset may include analytics data associated with all user visits to a given website. Analytics data may be processed to generate and forecast metric values that are indicative of a particular trait or characteristic of the data (e.g., a number of website visits, a number of items purchased, value of items purchased, a conversion rate, a promotion effectiveness index, etc.).

Network content analytics provider 106 may include a third-party website traffic statistic service. Network content analytics provider 106 may include an entity that is physically separate from content providers 102a and 102b. Network content analytics provider 106 may reside on a different network location from content providers 102a and 102b and/or client device 154. In the illustrated embodiment, for example, network content analytics provider 106 is communicatively coupled to client device 154 via network 108. Network content analytics provider 106 may be communicatively coupled to content providers 102a and 102b via network 108. Network content analytics provider 106 may receive analytics data 104 from client device 154 via network 108 and may provide corresponding analytics data (e.g., web analytics reports) to content provider 102a and 102b or to network analytics forecasting module 120 via network 108 or some other form of communication.

In the illustrated embodiment, network activity analytics provider 106 includes a network content analytics server 114, a network content analytics database 116, and a network analytics forecasting module 120. In some embodiments, network analytics forecasting module 120 may include computer executable code (e.g., executable software modules) stored on a computer readable storage medium that is executable by a computer to provide associated processing. For example, network analytics forecasting module 120 may process web analytics datasets stored in database 116 to generate corresponding web analytics reports, including forecasts, that are provided to content providers 102a and 102b. Accordingly, network analytics forecasting module 120 may assess analytics data 104 to assess and forecast an effectiveness of one or more promotions and perform the trend ascertainment and predictive functions described herein.

Network content analytics server 114 may service requests from one or more clients. For example, upon loading/rendering of a webpage 112a by browser 112 of client device 154, browser 112 may generate a request to network content analytics server 114 via network 108. Network content analytics server 114 may process the request and return appropriate content (e.g., an image) 156 to browser 112 of client device 154. In some embodiments, the request includes a request for an image, and network content analytics provider 106 simply returns a single transparent pixel for display by browser 112 of client device 154, thereby fulfilling the request. The request itself may also include web analytics data embedded therein. Some embodiments may include content provider 102a and/or 102b embedding or otherwise providing a pointer to a resource, known as a "web bug", within the HTML code of the webpage 112a provided to client device 154. The resource may be invisible a user, such as a transparent one-pixel image for display in a web page. The pointer may direct browser 112 of client device 154 to request the resource from network content analytics server 114. Network content analytics server 114 may record the request and any additional information associated with the request (e.g., the date and time, and/or identifying information that may be encoded in the resource request).

In some embodiments, an image request embedded in the HTML code of the webpage may include codes/strings that are indicative of web analytics data, such as data about a user/client, the user's computer, the content of the webpage, or any other web analytics data that is accessible and of interest. A request for an image may include, for example, "image.gif/XXX . . . " wherein the string "XXX . . . " is indicative of the analytics data 104. For example, the string "XXX" may include information regarding user interaction with a website (e.g., activity data).

Network content analytics provider 106 may parse the request (e.g., at network content analytics server 114 or network analytics forecasting module 120) to extract the web analytics data contained within the request. Analytics data 104 may be stored in database 116, or a similar storage/memory device, in association with other accumulated web analytics data. In some embodiments, network analytics forecasting module 120 may receive/retrieve analytics data from network content analytics server 114 and/or database 116. Network analytics forecasting module 120 may process the analytics data to generate one or more web analytics reports, including graphical displays and trend and prediction forecasts, as described herein. In some embodiments, models and parameters are selected as described herein to support the predicting. For example, network content analytics server 114 may filter the raw web analytics data received at network content analytics server 114 to be used by network analytics forecasting module 120 in generating trends and forecasts analytics reports, as may be requested by a website administrator of one of content providers 102a and 102b. Reports, for example, may include overviews and statistical analyses describing the relative frequency or absolute numbers with or in which various site paths are being followed through the content provider's website, the rate of converting a website visit to a purchase (e.g., conversion), an effectiveness of various promotions, and so forth, and identifying trends in and making predictions from the data as requested.

In some embodiments, client device 154 executes a software application, such as browser application 112, for accessing and displaying one or more webpages 112a. In response to a user command, such as clicking on a link or typing in a uniform resource locator (URL), browser application 112 may issue a webpage request 122 to web content server 110a of content provider 102a via network 108 (e.g., via the Internet). In response to request 122, web content server 110a may transmit the corresponding content 126a (e.g., webpage HTML code corresponding to webpage 112a) to browser application 112. Browser application 112 may interpret the received webpage code to display the requested webpage 112a at a user interface (e.g., monitor) of client 154. Browser application 112 may generate additional requests for content from the servers, or other remote network locations, as needed. For example, if webpage code calls for content, such as an advertisement, to be provided by content provider 102b, browser application 112 may issue an additional request 130 to web content server 110b. Web content server 110b may provide a corresponding response 128 containing requested content, thereby fulfilling the request. Browser application 112 may assemble the additional content for display within webpage 112a.

In some embodiments, client device 154 also transmits webpage visitation tracking information to web analytics provider 106. For example, as described above, webpage code may include executable code (e.g., a web bug) to initiate a request for data from network content analytics server 114 such that execution of webpage code at browser 112 causes browser 112 to generate a corresponding request (e.g., a web-beacon request) 132 for the data to web analytics server 114. In some embodiments, request 132 may itself have analytics data (e.g., analytics data 104) contained/embedded therein, or otherwise associated therewith, such that transmitting request 132 causes transmission of analytics data from client 154 to web analytics provider 106. For example, as described above, request 132 may include an image request having an embedded string of data therein. Network content analytics provider 106 may process (e.g., parse) request 132 to extract analytics data 104 contained in, or associated with, request 132.

In some embodiments, request 132 from client 154 may be forwarded from network content analytics server 114 to database 116 for storage and/or to network analytics forecasting module 120 for processing. Network analytics forecasting module 120 and/or network content analytics server 114 may process the received request to extract web analytics data 104 from request 132. Where request 132 includes a request for an image, network content analytics server 114 may simply return content/image 134 (e.g., a single transparent pixel) to browser 112, thereby fulfilling request 128. In some embodiments, network content analytics provider 106 may transmit analytics data (e.g., analytics data 104) and/or a corresponding analytics reports, which in some embodiments contain predictions generated with models and parameters selected as described herein, to content providers 102a and/or 102b, or other interested entities.

For example, analytics data and/or web analytics reports 140a and 140b (e.g., including processed web analytics data, which in some embodiments contains predictions generated with models and parameters selected as described herein) may be forwarded to site administrators of content providers 102a and 102b via network 108, or other forms of communication. In some embodiments, a content provider may log-in to a website, or other network based application, hosted by network content analytics provider 106, and may interact with network analytics forecasting module 120 to generate custom web analytics reports, which in some embodiments contain predictions generated with models and parameters selected as described herein. For example, content provider 102a may log into a web analytics website via website server 114, and may interactively submit request 142a to generate reports from network analytics forecasting module 120 for predictions of various metrics (e.g., number of conversions for male users that visit the home page of the content provider's website, an effectiveness of a promotion, etc.), and network analytics provider 106 may return corresponding reports (e.g., reports dynamically generated via models and parameters selected as described herein and applied against results of corresponding queries for data stored in database 116). In some embodiments, content providers 102a and 102b may provide analytics data to web analytics provider 106.

In some embodiments, reports may include one or more metric values that are indicative of a characteristic/trait of a set of data or may include trends and prediction reporting based on models and parameters selected as described herein.

Figure 2:
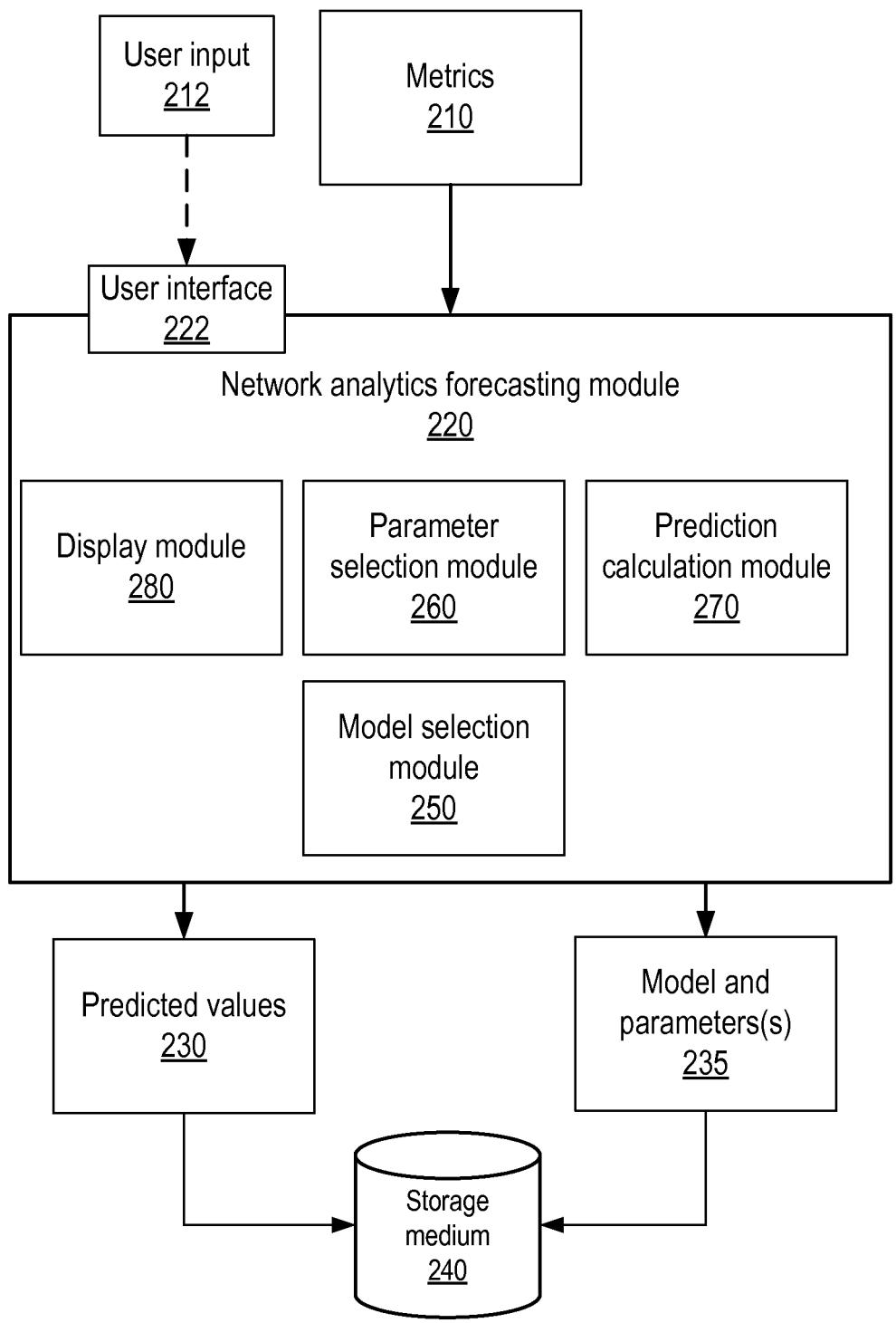
FIG. 2 depicts a module that may implement predictive analysis of network analytics with model selection, according to some embodiments.

FIG. 2 depicts a module that may implement predictive analysis of network analytics with model selection, according to some embodiments. Network analytics forecasting module 220 may, for example, implement one or more of a metric analysis tool, a metric prediction tool, a model selection tool, and a parameter selection tool, for performing the functions described herein with respect to FIGS. 6-9. FIG. 10 illustrates an example computer system on which embodiments of network analytics forecasting module 220 may be implemented. Network analytics forecasting module 220 receives as input one or more values of metrics 210, as discussed above. Network analytics forecasting module 220 may receive user input 212 activating one or more of a metric analysis tool, a metric prediction tool, a model selection tool, and a parameter selection tool, for performing the functions described herein with respect to FIGS. 6-9. Network analytics forecasting module 220 then performs the functions described herein with respect to FIGS. 6-9 on the metrics 210, according to user input 212 received via user interface 222. The user may activate a tool and further generate predictions of trends, analysis of relationships, or analysis of predictions. Network analytics forecasting module 220 generates as output one or more models and parameters 235, as well as one or more sets of predicted values 230. Models and parameters 235 and predicted values 230 may, for example, be stored to a storage medium 240, such as system memory, a disk drive, DVD, CD, etc.

In some embodiments, network analytics forecasting module 220 may provide a user interface 222 via which a user may interact with the module 220, for example to activate a activate a model selection tool, configure selection of parameter, and request predictions. In some embodiments, user interface 222 may provide user interface elements, such as dropdown boxes, whereby the user may select options including, but not limited to, models, parameters, values displayed and granularity of calculations. An example of such a user interface is discussed below with respect to FIGS. 3-5.

A prediction calculation module 270 may perform predicting future network analytics metric values using a network analytics forecasting model with a preferred model error measurement. A model selection module 250 performs selecting a network analytics forecasting model with a preferred model error measurement from among a set of model error measurements for a set of network analytics forecasting models. A parameter selection module 260 performs, for each of a plurality of sets of parameter values of parameters of the network analytics forecasting model with the preferred error measurement, calculating a corresponding set of predicted network analytics metric values corresponding to individual ones of the set of actual network analytics metric values in the network analytics metrics data set, and comparing individual ones of the corresponding set of predicted network analytics metric values to corresponding ones of the set of actual network analytics metric values to generate a parameter set error measurement, generating an error measurement reflecting the comparing. Parameter selection module 260 further performs selecting a set of parameter values with a preferred model error measurement.

A prediction calculation module 270 is used for predicting future network analytics metric values using the network analytics forecasting model with the preferred model error measurement. A display module 280 is used for displaying a plurality of values of the metric and predictions of the metric.

User Interface for Predictive Analytics of Network Activity

Figure 3:
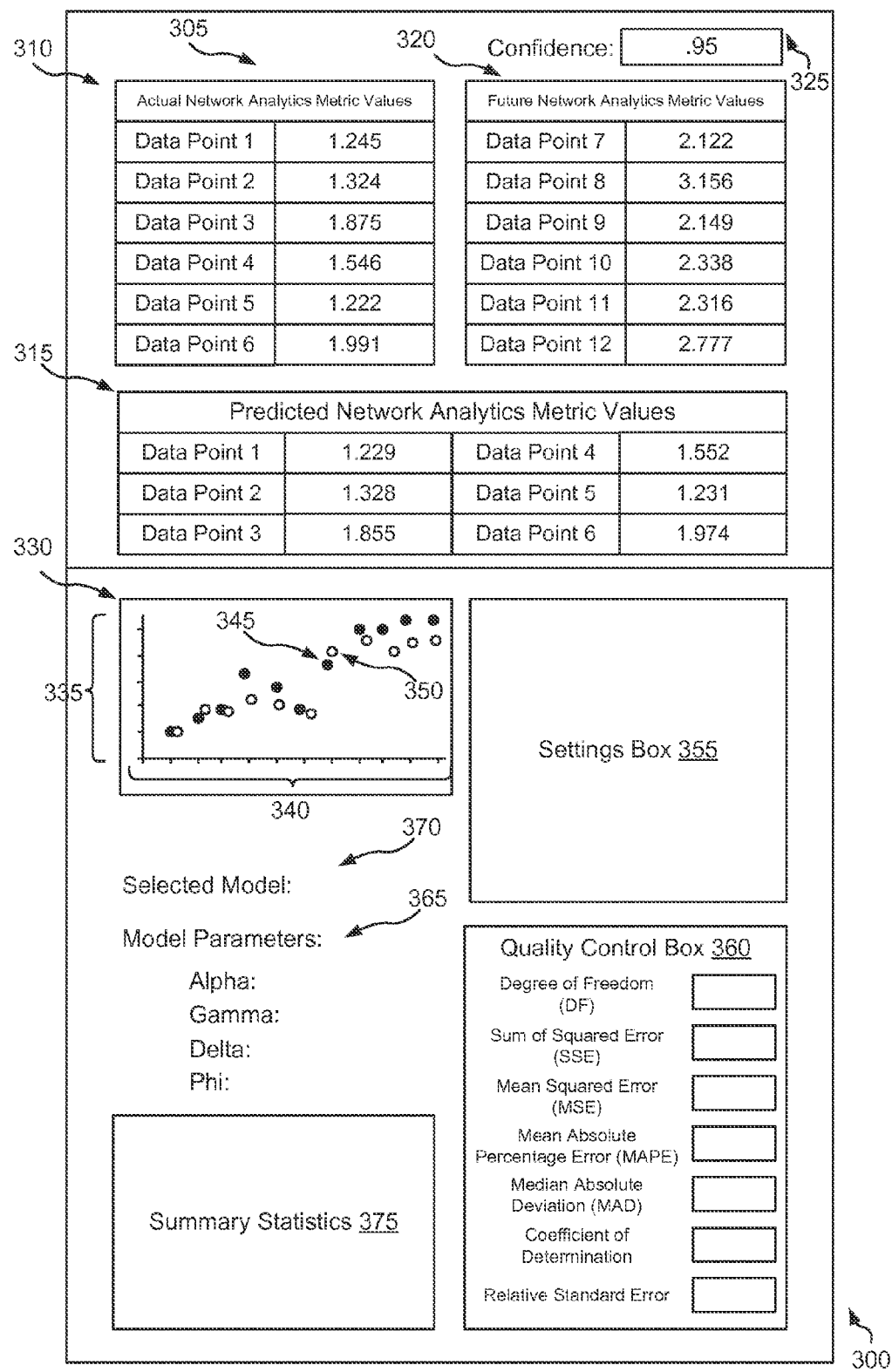
FIG. 3 illustrates a user interface that may be used in conjunction with predictive analysis of network analytics with model selection, according to some embodiments.

FIG. 3 illustrates a user interface that may be used in conjunction with predictive analysis of network analytics with model selection, according to some embodiments. A user interface 300 includes a data display window 305 showing actual network analytics metric values 310, predicted network analytics metric values corresponding to individual ones of the set of actual network analytics metric values 315, future network analytics metric values 320 predicted using the network analytics forecasting model with the preferred model error measurement and a confidence interval 325 for the future network analytics metric values 320.

A point forecast box 330 displaying details of a prediction 335 for a selected time period 340 and a comparison 345 to a target 350. A settings box 355 includes display settings. A quality control box 360 displays statistics describing comparing individual ones of the corresponding set of predicted network analytics metric values to corresponding ones of the set of actual network analytics metric values to generate a parameter set error measurement. Quality control box 360 includes:

DF—degrees of freedom, which quantifies the amount of information embodiments can elicit from our data; or rather, the number of independent pieces of information available to estimate a parameter. In some embodiments, more data equates to a higher DF which equates to more parameters with better accuracy.

SSE—sum of squared error, measures the amount of variation in the model. The difference (error) between the models prediction and the actual value that occurred–summed up for every prediction and actual value pair.

MSE—mean squared error, the average amount of error or variation in the model per data point. More formally, MSE is SSE divided by number of data points. This is one way of estimating the variance of data.

MAPE—mean absolute percentage error, this is average percentage difference between the observed value and the predicted value. If MAPE is 5.2, then it may be interpreted that a model is 94.8% accurate (100−5.2).

MAD—median absolute deviation, the absolute error value for which half of the errors are larger and half are smaller. When data has some large values (outliers), this error measurement may better represent the accuracy of the model.

R2—coefficient of determination, the proportion of variability in data that is explained by the model. Offers some indication of how well future outcomes may be predicted by a model. Generally speaking, higher values of R2 indicate better prediction performance.

Sr—relative standard error, the standard error divided by the mean squared error (MSE). This allows a sense of how much variation there is around a prediction in the context of the variation associated with the model.

Model parameters 365 and a selected model 370 are displayed. Model parameters 365 include:

Alpha ($\alpha$)—a smoothing constant between 0 and 1 that represents the level (or mean) of the time series. Some embodiments choose a value that minimizes the SSE in response to actuation of the Optimize button.

Gamma ($\gamma$)—a smoothing constant between 0 and 1 that represents the growth rate of the time series. Some embodiments choose a value that minimizes the SSE in response to actuation of the Optimize button.

Delta ($\delta$)—a smoothing constant between 0 and 1 that represents the seasonal factor of the time series. Some embodiments choose a value that minimizes the SSE in response to actuation of the Optimize button.

Phi ($\phi$)—a smoothing constant between 0 and 1 that represents the damped growth factor of the time series. If time series has an increasing or decreasing rate of growth, we damp the growth rate. Some embodiments choose a value that minimizes the SSE in response to actuation of the Optimize button.

A set of summary statistics 375 describes actual network analytics metric values 310. The summary statistics include:

Obs—the number of observations, or periods (e.g., 137 days or 45 weeks or 32 months, etc.).

Min—the minimum value for the metric chosen over the total time period.

Max—the maximum value for the metric chosen over the total time period.

Mean—the average value for the metric chosen over the total time period.

SD—the standard deviation for the metric chosen over the total time period.

Figure 4:
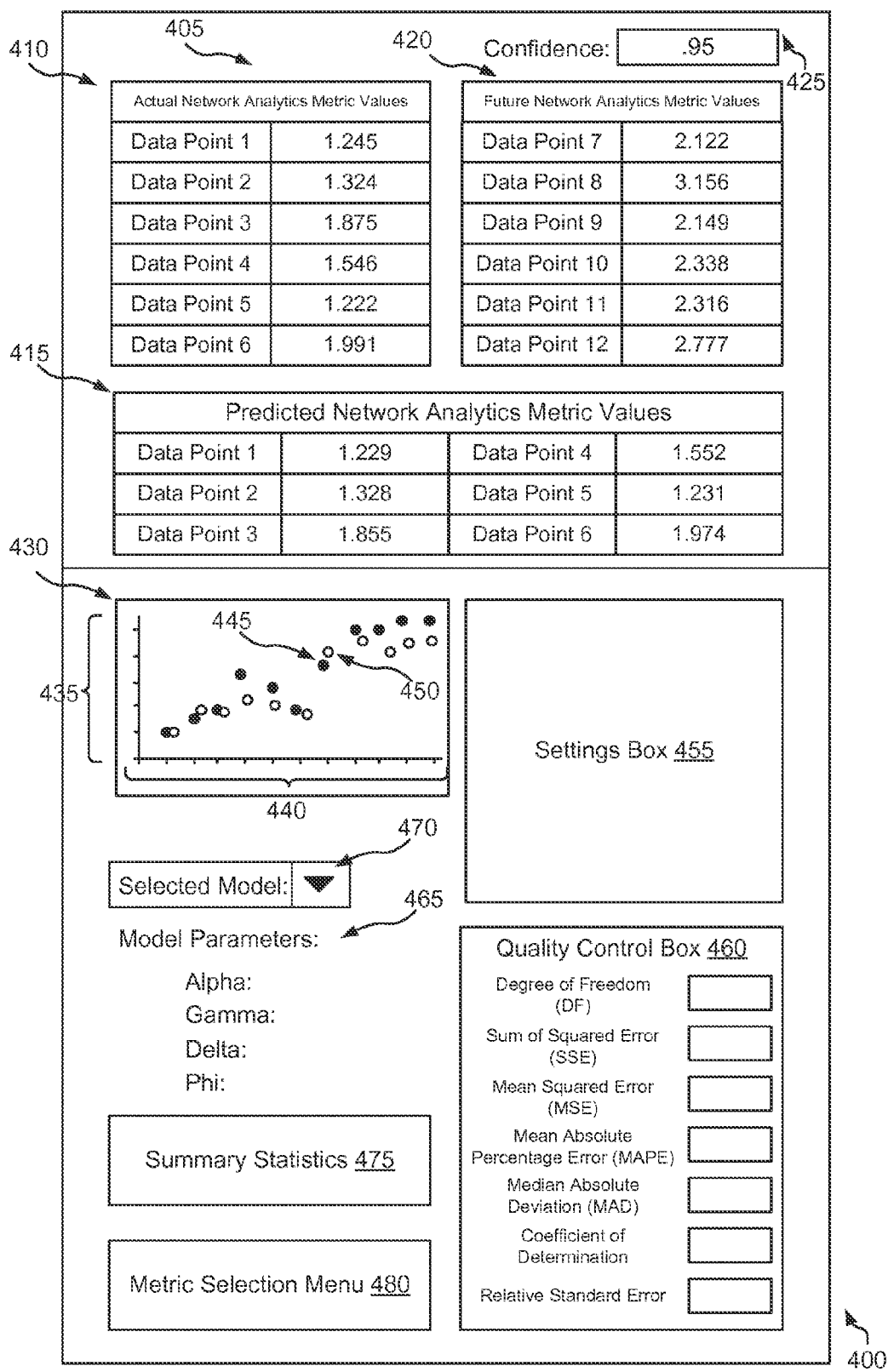
FIG. 4 depicts a user interface that may be used in conjunction with predictive analysis of network analytics with model selection, according to some embodiments.

FIG. 4 illustrates a user interface that may be used in conjunction with predictive analysis of network analytics with model selection, according to some embodiments. A user interface 400 includes a data display window 405 showing actual network analytics metric values 410, predicted network analytics metric values corresponding to individual ones of the set of actual network analytics metric values 415, future network analytics metric values 420 predicted using the network analytics forecasting model with the preferred model error measurement and a confidence interval 425 for the future network analytics metric values 420.

A point forecast box 430 displaying details of a prediction 435 for a selected time period 440 and a comparison 445 to a target 450. A settings box 455 includes display settings. A quality control box 460 displays statistics describing comparing individual ones of the corresponding set of predicted network analytics metric values to corresponding ones of the set of actual network analytics metric values to generate a parameter set error measurement. Model parameters 465 and a (user adjustable) selected model 470 are displayed. A set of summary statistics 475 describes actual network analytics metric values 410. A metric selection menu 480 is displayed.

Figure 5:
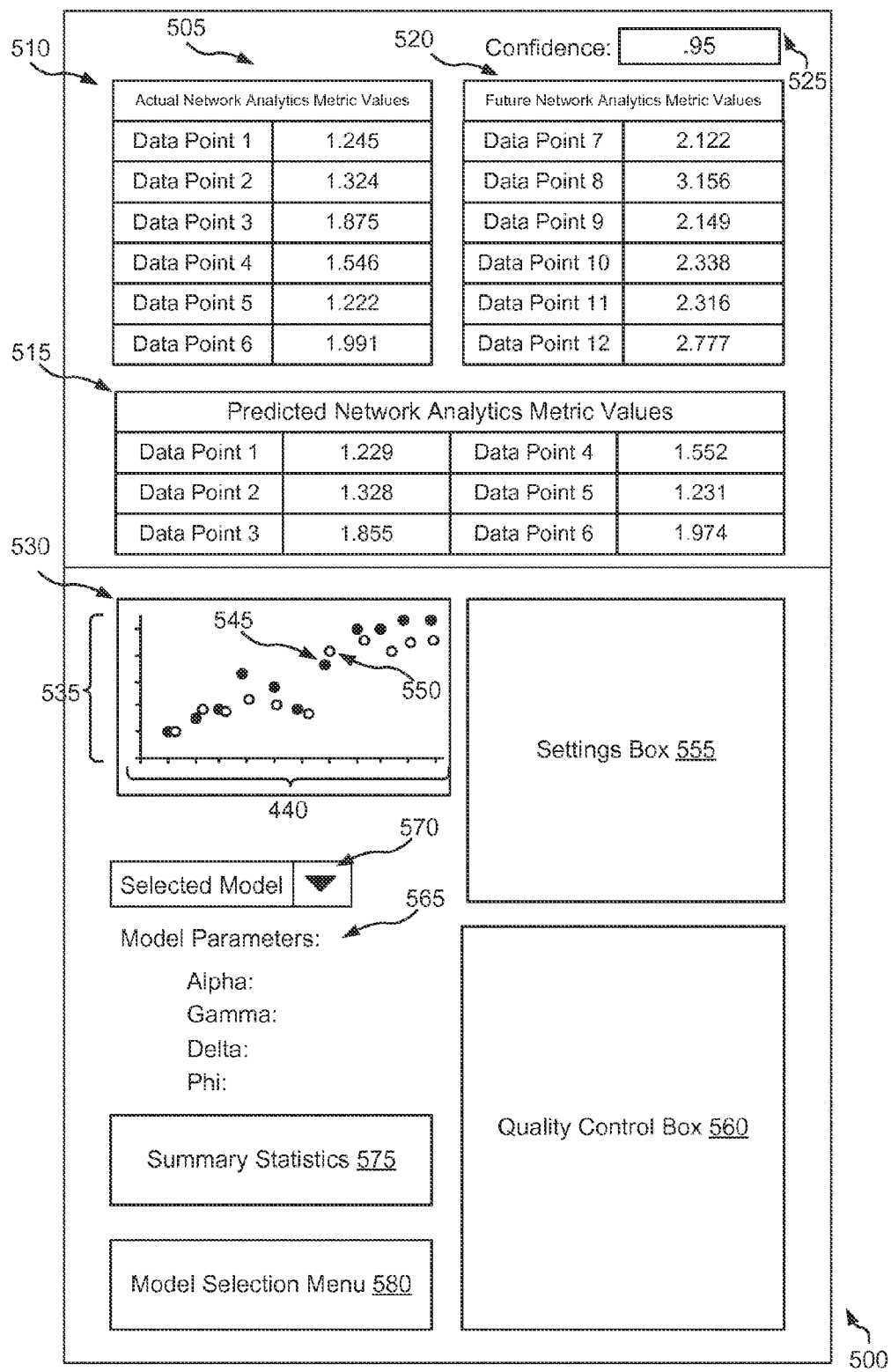
FIG. 5 illustrates a user interface that may be used in conjunction with predictive analysis of network analytics with model selection, according to some embodiments.

FIG. 5 illustrates a user interface that may be used in conjunction with predictive analysis of network analytics with model selection, according to some embodiments. A user interface 500 includes a data display window 505 showing actual network analytics metric values 510, predicted network analytics metric values corresponding to individual ones of the set of actual network analytics metric values 515, future network analytics metric values 520 predicted using the network analytics forecasting model with the preferred model error measurement and a confidence interval 525 for the future network analytics metric values 520.

A point forecast box 530 displaying details of a prediction 535 for a selected time period 540 and a comparison 545 to a target 550. A settings box 555 includes display settings. A quality control box 560 displays statistics describing comparing individual ones of the corresponding set of predicted network analytics metric values to corresponding ones of the set of actual network analytics metric values to generate a parameter set error measurement. Model parameters 565 and a (user adjustable) selected model 570 are displayed. A set of summary statistics 575 describes actual network analytics metric values 510. A model selection menu [[5]]580 is displayed.

Operations for Implementing Predictive Analytics of Network Activity

Figure 6:
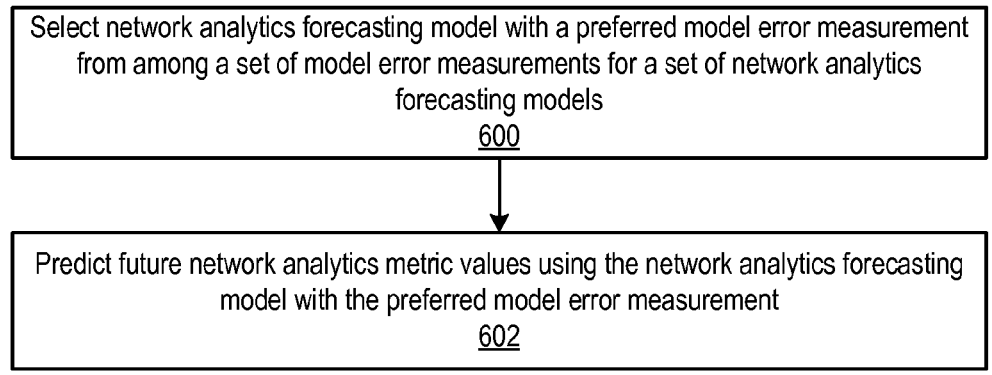
FIG. 6 depicts a high-level logical flowchart of operations performed to implement one embodiment of predictive analysis of network analytics with model selection, according to some embodiments.

FIG. 6 depicts a high-level logical flowchart of operations performed to implement one embodiment of predictive analysis of network analytics with model selection, according to some embodiments. A network analytics forecasting model with a best model error measurement is selected from among a set of model error measurements for a set of network analytics forecasting models (block 600). Future network analytics metric values are predicted using the network analytics forecasting model with the best model error measurement (block 602).

Figure 7:
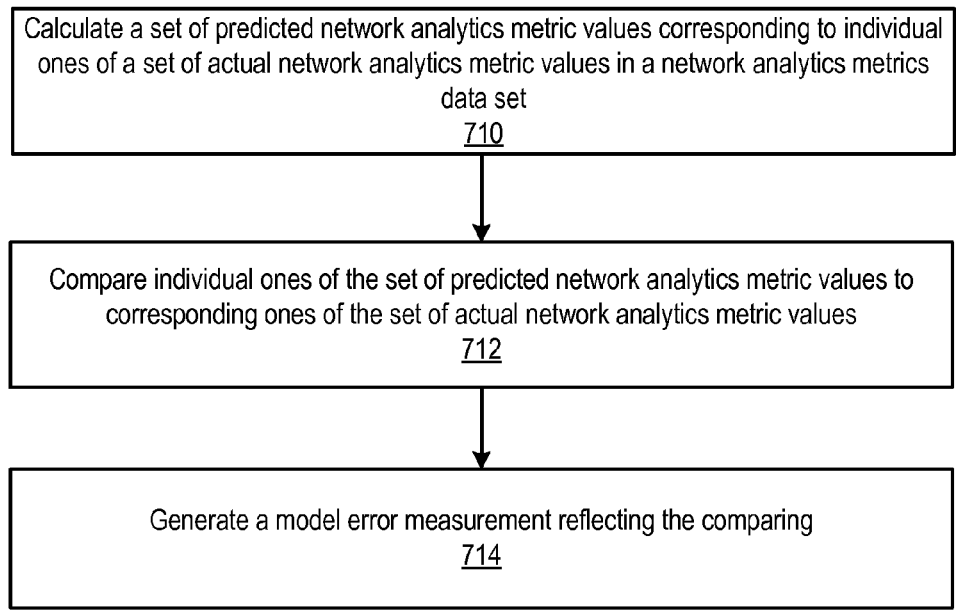
FIG. 7 illustrates a high-level logical flowchart of operations performed to select a model for predictive analysis of network analytics, according to some embodiments.

FIG. 7 illustrates a high-level logical flowchart of operations performed to select a model for predictive analysis of network analytics, according to some embodiments. A set of predicted network analytics metric values corresponding to individual ones of a set of actual network analytics metric values in a network analytics metrics data set is calculated (block 710). Individual ones of the set of predicted network analytics metric values are compared to corresponding ones of the set of actual network analytics metric values (block 712). A model error measurement reflecting the comparing is generated (block 714).

Figure 8:
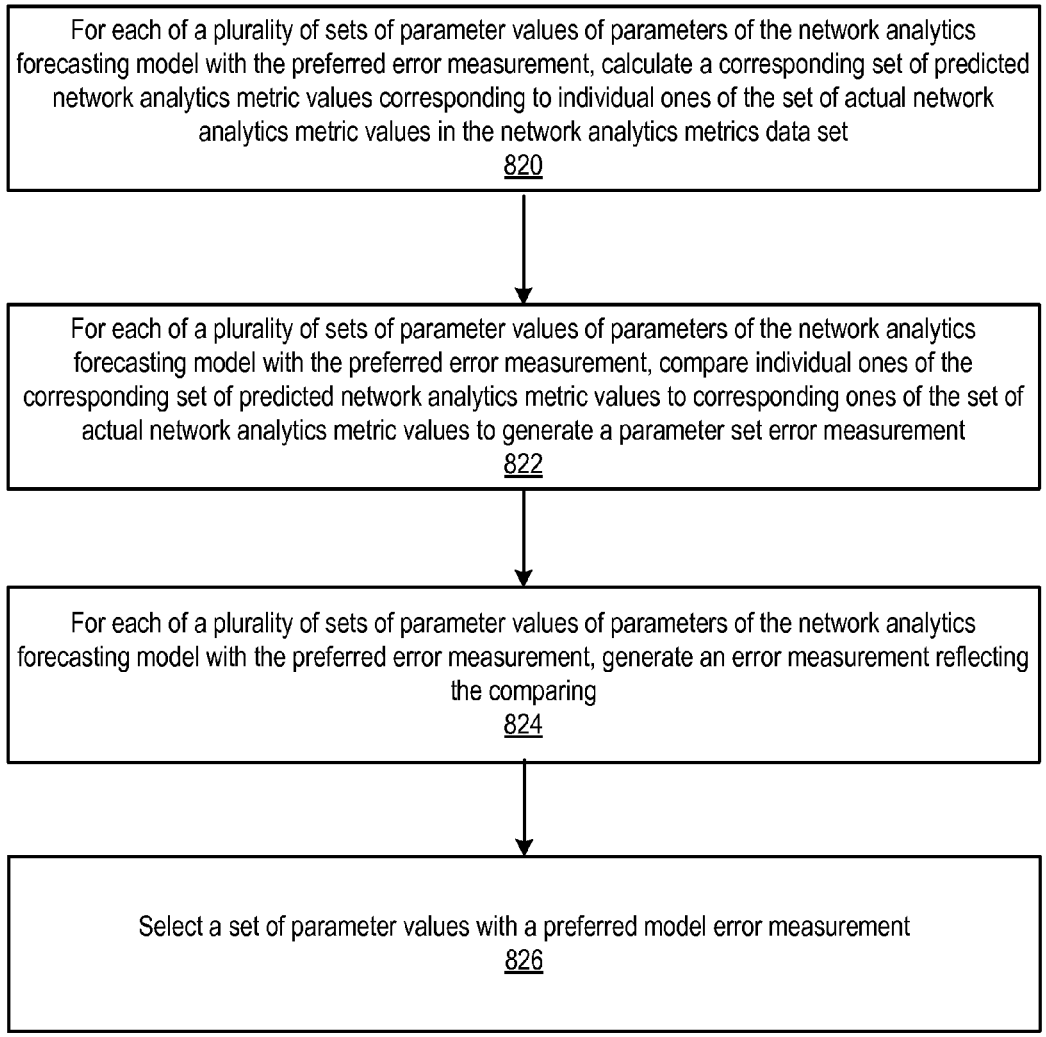
FIG. 8 depicts a high-level logical flowchart of operations performed to implement parameter value selection in the context of predictive analysis of network analytics with model selection, according to some embodiments.

FIG. 8 depicts a high-level logical flowchart of operations performed to implement parameter value selection in the context of predictive analysis of network analytics with model selection, according to some embodiments. For each of a plurality of sets of parameter values of parameters of the network analytics forecasting model with the best error measurement, a corresponding set of predicted network analytics metric values corresponding to individual ones of the set of actual network analytics metric values in the network analytics metrics data set is calculated (block 820). For each of a plurality of sets of parameter values of parameters of the network analytics forecasting model with the best error measurement, individual ones of the corresponding set of predicted network analytics metric values are compared to corresponding ones of the set of actual network analytics metric values to generate a parameter set error measurement (block 822). For each of a plurality of sets of parameter values of parameters of the network analytics forecasting model with the best error measurement, an error measurement reflecting the comparing is generated (block 824). A set of parameter values with a preferred model error measurement is selected (block 826).

Figure 9:
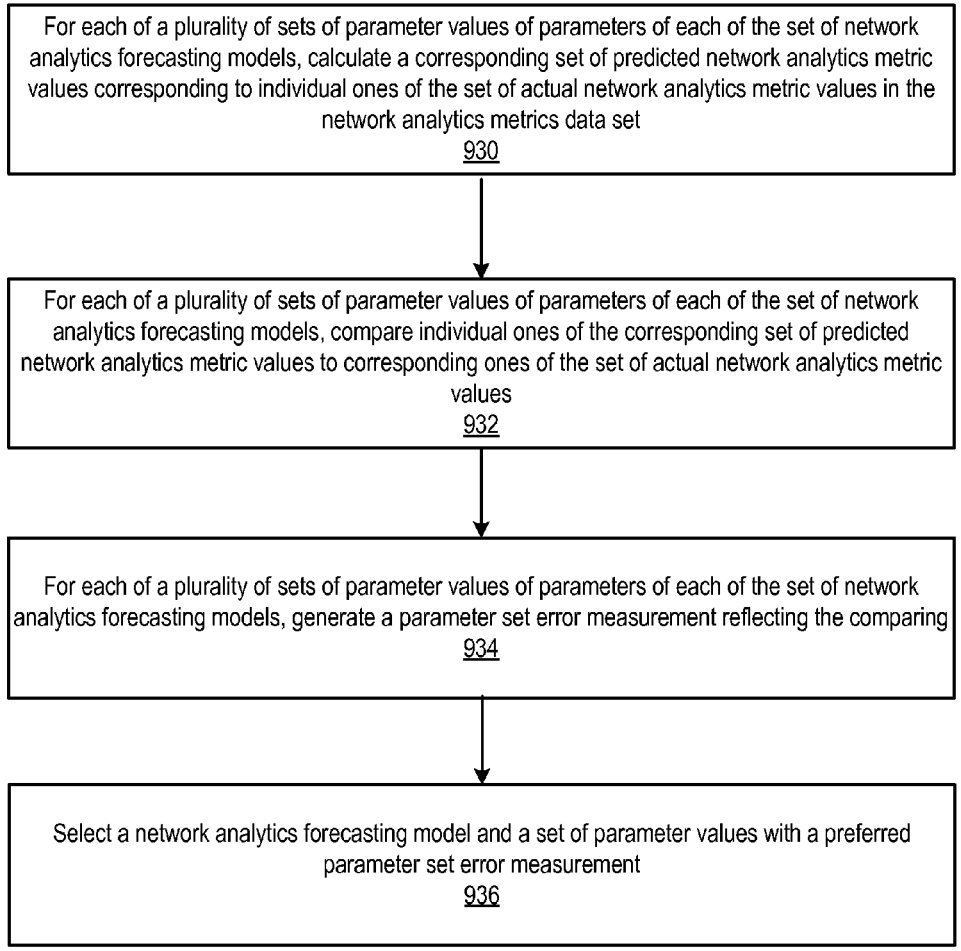
FIG. 9 illustrates a high-level logical flowchart of operations performed to implement parameter value selection in the context of predictive analysis of network analytics with model selection, according to some embodiments.
Figure 10:
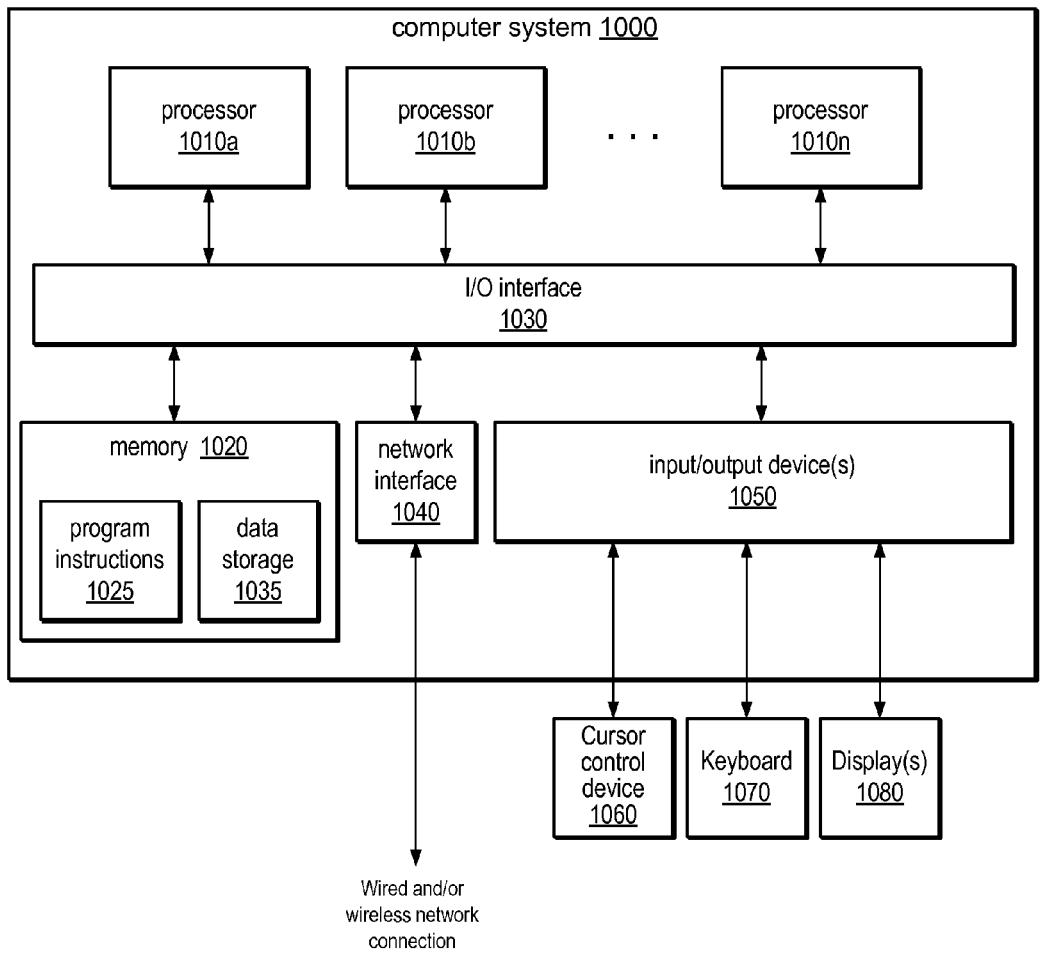
FIG. 10 depicts an example computer system that may be used in embodiments.

FIG. 9 depicts a high-level logical flowchart of operations performed to implement parameter value selection in the context of predictive analysis of network analytics with model selection, according to some embodiments. For each of a plurality of sets of parameter values of parameters of each of the set of network analytics forecasting models, a corresponding set of predicted network analytics metric values corresponding to individual ones of the set of actual network analytics metric values in the network analytics metrics data set is selected (block 930). For each of a plurality of sets of parameter values of parameters of each of the set of network analytics forecasting models, individual ones of the corresponding set of predicted network analytics metric values are compared to corresponding ones of the set of actual network analytics metric values (block 932). For each of a plurality of sets of parameter values of parameters of each of the set of network analytics forecasting models, a parameter set error measurement reflecting the comparing is generated (block 934). A network analytics forecasting model and a set of parameter values with a preferred parameter set error measurement are selected (block 936).

Example System

Embodiments of a network activity analytics forecasting module and/or of the various network activity prediction and forecast model and parameter selection techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a network activity analytics analysis module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice, or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a network activity analytics analysis module as described herein, and data storage 1035, comprising various data accessible by program instructions 1025. In one embodiment, program instructions 1025 may include software elements of embodiments of a network activity analytics analysis module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a network activity analytics analysis module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    obtaining a network analytics metrics data set including a first set of raw network analytics metric values, the first set of raw network analytics metric values being associated with one or more marketing promotions;
    filtering the raw network analytics metric values to generate a reduced network analytics metrics data set, wherein the reduced network analytics metrics data set includes a second set of raw network analytics metric values;
    selecting, by one or more processors, a network analytics forecasting model from a set of network analytics forecasting models, wherein each of the set of network analytics forecasting models is associated with a corresponding model error measurement and a set of model parameters, wherein the selecting of the network analytics forecasting model comprises, for each of the set of network analytics forecasting models:
- calculating a first set of predicted network analytics metric values corresponding to the second set of raw network analytics metric values; and
- generating a model error measurement based on a comparison between the first calculated set of predicted network analytics metric values and the second set of raw network analytics metric values;

selecting, based on a parameter set score, a set of parameters for the selected network analytics forecasting model from a plurality of parameter sets, wherein selecting the set of parameters comprises:
- calculating a second set of predicted network analytics metric values using the set of parameters and the selected network analytics forecasting model; and
- generating the parameter set score for the set of parameters based on a difference between the second set of predicted network analytics metric values and the second set of raw network analytics metric values;

predicting subsequent network analytics metric values using the selected network analytics forecasting model and the selected set of parameters;

determining the effectiveness of the one or more marketing promotions using the predicted subsequent network analytics metric values, the selected network analytics forecasting model, and the selected set of parameters;

providing information related to an advertising campaign based on the effectiveness of the one or more marketing promotions.

2. The method of claim 1, further comprising: providing a graphical user interface for presenting information related to the raw network analytics metric values, one or more details related to the predicted subsequent network analytics metric values, and one or more quality control statistics.

3. The method of claim 1, further comprising receiving, from a user, a confidence value, wherein selection of the network analytics forecasting model is further based on the confidence value.

4. The method of claim 1, wherein the selecting of the set of parameters occurs subsequent to the selecting of the network analytics forecasting model.

5. The method of claim 1, further comprising receiving, from a user, an override selection indicating another network analytics forecasting model, wherein the predicting the subsequent network analytics metric values uses the another network analytics forecasting model.

6. A system, comprising:
a processor configured to execute instructions stored in a non-transitory computer readable medium to perform operations, the operations comprising:
- obtaining a network analytics metrics data set including a first set of raw network analytics metric values, the first set of raw network analytics metric values being associated with one or more marketing promotions;
- filtering the raw network analytics metric values to generate a reduced network analytics metrics data set, wherein the reduced network analytics metrics data set includes a second set of raw network analytics metric values;
- selecting a network analytics forecasting model from a set of network analytics forecasting models, wherein each of the set of network analytics forecasting models is associated with a corresponding model error measurement and a set of model parameters, wherein the selecting of the network analytics forecasting model comprises, for each of the set of network analytics forecasting models:
  - calculating a first set of predicted network analytics metric values corresponding to the second set of raw network analytics metric values; and
  - generating a model error measurement based on a comparison between the first calculated set of predicted network analytics metric values and the second set of raw network analytics metric values;
- selecting, based on a parameter set score, a set of parameters for the selected network analytics forecasting model from a plurality of parameter sets, wherein selecting the set of parameters comprises:
  - calculating a second set of predicted network analytics metric values using the parameter set and the selected network analytics forecasting model; and
  - generating the parameter set score for the set of parameters based on a difference between the second set of predicted network analytics metric values and the second set of raw network analytics metric values;
- predicting subsequent network analytics metric values using the selected network analytics forecasting model and the selected set of parameters;
- determining the effectiveness of the one or more marketing promotions using the predicted subsequent network analytics metric values, the selected network analytics forecasting model, and the selected set of parameters;
- providing information related to an advertising campaign based on the effectiveness of the one or more marketing promotions.

7. The system of claim 6, wherein the operations further comprise:
providing a graphical user interface for presenting information related to the raw network analytics metric values, one or more details related to the predicted subsequent network analytics metric values, and one or more quality control statistics.

8. The system of claim 6, wherein the operations further comprise receiving, from a user, a confidence value, wherein selection of the network analytics forecasting model is further based on the confidence value.

9. The system of claim 6, wherein the selecting of the set of parameters occurs subsequent to the selecting of the network analytics forecasting model.

10. The system of claim 6, wherein the operations further comprise receiving, from a user, an override selection indicating another network analytics forecasting model, wherein the predicting the subsequent network analytics metric values uses the another network analytics forecasting model.

11. A non-transitory computer-readable medium on which is encoded program code, the program code comprising:
- program code for obtaining a network analytics metrics data set including a first set of raw network analytics metric values, the first set of raw network analytics metric values being associated with one or more marketing promotions;
- program code for filtering the raw network analytics metric values to generate a reduced network analytics metrics data set, wherein the reduced network analytics metrics data set includes a second set of raw network analytics metric values;
- program code for selecting a network analytics forecasting model from a set of network analytics forecasting models, wherein each of the set of network analytics forecasting models is associated with a corresponding model error measurement and a set of model parameters, wherein the program code for selecting of the network analytics forecasting model includes, for each of the set of network analytics forecasting models:
  program code for calculating a first set of predicted network analytics metric values corresponding to the second set of raw network analytics metric values; and
  program code for generating a model error measurement based on a comparison between the first calculated set of predicted network analytics metric values and the second set of raw network analytics metric values;
program code for selecting, based on a parameter set score, a set of parameters for the selected network analytics forecasting model from a plurality of parameter sets, wherein selecting the set of parameters includes:
  program code for calculating a second set of predicted network analytics metric values using the parameter set and the selected network analytics forecasting model; and
  program code for generating the parameter set score for the set of parameters based on a difference between the second set of predicted network analytics metric values and the second set of raw network analytics metric values;
program code for predicting subsequent network analytics metric values using the selected network analytics forecasting model and the selected set of parameters;
program code for determining the effectiveness of the one or more marketing promotions using the predicted subsequent network analytics metric values, the selected network analytics forecasting model, and the selected set of parameters;
program code for providing information related to an advertising campaign based on the effectiveness of the one or more marketing promotions.

12. The non-transitory computer-readable medium of claim 11, further comprising:
  program code for providing a graphical user interface for presenting information related to the raw network analytics metric values, one or more details related to the predicted subsequent network analytics metric values, and one or more quality control statistics.

13. The non-transitory computer-readable medium of claim 11, further comprising program code for receiving, from a user, a confidence value, wherein selection of the network analytics forecasting model is further based on the confidence value.

14. The non-transitory computer-readable medium of claim 11, wherein the selecting of the set of parameters occurs subsequent to the selecting of the network analytics forecasting model.

15. The non-transitory computer-readable medium of claim 11, further comprising program code for receiving, from a user, an override selection indicating another network analytics forecasting model, wherein the predicting the subsequent network analytics metric values uses the another network analytics forecasting model.

* * * * *